(12) United States Patent
Crippa et al.

(10) Patent No.: US 10,156,274 B2
(45) Date of Patent: Dec. 18, 2018

(54) CALIPER FOR DISC BRAKE

(71) Applicant: FRENI BREMBO S.P.A., Curno, Bergamo (IT)

(72) Inventors: Cristian Crippa, Bergamo (IT); Giovanni Fattori, Bergamo (IT); Andrea Teruzzi, Bergamo (IT)

(73) Assignee: FRENI BREMBO, S.P.A., Curno, Bergamo (IT)

( * ) Notice: Subject to any disclaimer, the term of this patent is extended or adjusted under 35 U.S.C. 154(b) by 0 days.

(21) Appl. No.: 14/653,607

(22) PCT Filed: Dec. 13, 2013

(86) PCT No.: PCT/IB2013/060932
§ 371 (c)(1),
(2) Date: Jun. 18, 2015

(87) PCT Pub. No.: WO2014/097098
PCT Pub. Date: Jun. 26, 2014

(65) Prior Publication Data
US 2016/0003315 A1    Jan. 7, 2016

(30) Foreign Application Priority Data
Dec. 20, 2012    (IT) .............................. PD2012A0398

(51) Int. Cl.
*F16D 65/097*        (2006.01)
*F16D 55/2265*       (2006.01)

(52) U.S. Cl.
CPC ..... *F16D 65/0977* (2013.01); *F16D 55/2265* (2013.01); *F16D 65/0974* (2013.01); *F16D 65/0975* (2013.01)

(58) Field of Classification Search
CPC .. F16D 2127/02; F16D 55/228; F16D 65/097; F16D 65/0972; F16D 65/0975;
(Continued)

(56) References Cited

U.S. PATENT DOCUMENTS 2,994,410 A * 8/1961 Burnett ................ F16D 55/228
                                                188/152
3,710,896 A * 1/1973 Machek .............. F16D 65/0975
                                                188/73.36
(Continued)

FOREIGN PATENT DOCUMENTS

CN        102762881        10/2012
DE        1475372 A1 *     3/1969    ......... F16D 65/0975
(Continued)

OTHER PUBLICATIONS

Search Report from Italian Patent Applicaiton No. PD2012A000398 dated Sep. 4, 2013.
(Continued)

*Primary Examiner* — Bradley T King
*Assistant Examiner* — Stephen M Bowes
(74) *Attorney, Agent, or Firm* — Thomas Horstemeyer, LLP (57) ABSTRACT

The invention relates to a caliper for disc brake comprising a caliper body which defines a housing compartment for an associated brake disc and houses at least one pair of pads arranged on opposite sides of the housing compartment along an axial direction. The caliper body comprises at least one thrust piston axially operable against the pad, at least one axial guide which supports and guides the pad in the axial direction and a first thrust spring which exerts a thrust on the pad. Said thrust has a first axial component, axially directed in a direction of approach to the pistons, and a first radial component, perpendicular to the axial direction. Advantageously, the caliper body comprises at least one compensation spring which exerts an axial thrust on the pad in a direction of approach to the pistons. The second axial component annuls the momentum given by the friction force exchanged between the pad and the axial guide with respect to the point of application of the first axial component on the pad.

17 Claims, 11 Drawing Sheets

(58) Field of Classification Search
CPC ............ F16D 65/0977; F16D 65/0973; F16D 65/0974; F16D 65/0979
See application file for complete search history.

(56) References Cited

U.S. PATENT DOCUMENTS

| | | | | |
|---|---|---|---|---|
| 4,219,105 | A * | 8/1980 | Delaunay | F16D 65/0977 188/73.38 |
| 4,408,681 | A * | 10/1983 | Oshima | F16D 65/0977 188/73.38 |
| 4,491,204 | A * | 1/1985 | Dirauf | F16D 65/097 116/208 |
| 5,249,647 | A * | 10/1993 | Kobayashi | F16D 65/092 188/72.3 |
| 5,538,103 | A * | 7/1996 | Rueckert | F16D 55/227 188/1.11 L |
| 6,260,670 | B1 | 7/2001 | Maehara | |
| 6,378,665 | B1 * | 4/2002 | McCormick | F16D 65/0975 188/72.3 |
| 6,719,105 | B1 * | 4/2004 | Wemple | F16D 65/097 188/205 A |
| 2004/0262099 | A1 | 12/2004 | Crippa | |
| 2007/0246312 | A1 * | 10/2007 | Bach | F16D 65/0972 188/73.31 |
| 2008/0006489 | A1 * | 1/2008 | Morio | F16D 65/0977 188/73.38 |

FOREIGN PATENT DOCUMENTS

| | | |
|---|---|---|
| DE | 102008051236 A1 | 4/2010 |
| EP | 0794349 A2 | 9/1997 |
| JP | 2005507483 | 3/2005 |
| WO | 03038297 | 5/2003 |

OTHER PUBLICATIONS

International Search Report for PCT/IB2013/060932 dated Mar. 24, 2014.
English translation of the Abstract for DE 102008051236 published on Apr. 15, 2010.
Chinese Office Action; dated Dec. 28, 2016; 5 pages; Serial No. 2013800670083.
English Abstract of CN102762881, Espacenet.com, 1 page.
English Abstract of JP2005507483, Espacenet.com, 1 page.

* cited by examiner

CALIPER FOR DISC BRAKE

CROSS-REFERENCE TO RELATED APPLICATION

This application is the 35 U.S.C. § 371 national stage application of PCT Application No. PCT/IB2013/060932, filed Dec. 13, 2013, which claims priority to and the benefit of, IT Patent Application No. PD2012A000398, filed Dec. 20, 2012, both of which are herein incorporated by reference in their entirety.

FIELD OF APPLICATION

The object of the present invention is a caliper for disc brake.

The caliper for disc brake according to the present invention is particularly, but not exclusively, applied in the automotive industry.

BACKGROUND ART

As known, in calipers for disc brakes, the pads are pressed by at least one piston against the braking band of the associable brake disc. In the braking release step, the piston stops exerting the thrust action; however, the pad that is in contact with the braking band tends to remain in position, generating a residual braking torque and an annoying noise and a perceived vibration at the wheel.

For this reason, it is known to provide the calipers with plates or springs which exert a thrust action on the pads away from the brake disc. Obviously, during the braking step, such a thrust action is overcome by the braking action exerted by the pistons, but in the release step, said plates exert a thrust sufficient to move the pads away from the brake disc, avoiding contact between the pads and the brake disc when no braking action is required.

However, prior art solutions have several drawbacks.

In fact, the thrust exerted by the prior art plates is not in axis with the axial guides of the pads themselves; in fact, the pads are guided axially, i.e. parallel to the rotation axis of the associable brake disc, by pins or guides which slide in appropriate holes made in the support plates of the pads themselves. A friction is exerted between the pins and the related holes which, together with the axial thrust exerted by plates, generates a torque on the pad itself.

Such a torque tends to rotate the pad with negative effects both in terms of retraction and in terms of wear of the pad itself.

In fact, the rotation of the pad tends to make it jam on the guide and prevents a complete retraction sufficient to eliminate all the residual torque. Furthermore, the pad portion which remains in contact with the brake disc tends to wear and thus generate an abnormal wear of the braking surface of the pad.

Moreover, this abnormal wear also affects the braking efficiency and can cause the onset of vibration and noise during the braking itself.

DISCLOSURE OF THE INVENTION

Therefore, the object of the present invention is to eliminate, or at least reduce, the prior art problems mentioned above with a caliper for disc brake which allows to significantly reduce the presence of residual braking torques.

According to a preferred embodiment, such problems are solved by a caliper for disc brake comprising a first thrust spring which exerts a thrust on the pad, said thrust having a first axial component towards the pistons and a first radial component perpendicular to said axial direction and substantially incident to the rotation axis of the associable disc brake, and comprising at least a second thrust spring, mechanically separate from the first thrust spring, which exerts a second axial component directed axially and towards the pistons so as to favour the detachment of the pad from the disc brake in the absence of braking, the second thrust spring being sized in such a way that the second axial component annuls the moment of the friction force exchanged between the pad and the axial guide in relation to the point of application of the first axial component on the pad.

Preferably, the second thrust spring is calibrated so as to exert on the pad a second axial component, equal in intensity and opposite in direction, to the friction force exchanged, in the axial direction, between the pad and the axial guide, said second axial component being applied to the pad in correspondence with said axial guide.

Preferably, the second thrust spring comprises a central portion, at which the caliper body is coupled, and a pair of lever arms which interface with the pads, the central section being positioned astride the housing compartment of the associable disc brake and the lever arms acting on the pads axially opposite one another.

According to one embodiment, the central portion forms the attachment of the second thrust spring to the caliper body so as to keep the lever arms overhanging the central section.

According to one embodiment, the second thrust spring is constrained to an attachment bracket joined to the caliper body at a connection bridge between the half-bodies.

According to one embodiment, the second thrust spring is joined to an attachment bracket by means of a snap coupling between the central section and a pawl made on the attachment bracket.

Alternatively, the second thrust spring is joined to the attachment bracket by means of a snap coupling between the central section and a notch made on the attachment bracket.

In a particular embodiment, the attachment bracket constrains both the first and the second thrust spring to the caliper body.

Preferably, the lever arms of the second thrust spring end with a bent portion so as to couple to a lateral rim of the support plate of the pad.

According to one embodiment, the support plate of the pad comprises a groove adapted to at least partially house the bent portions of the lever arms.

According to one embodiment, the support plate comprises at least one coupling hole which houses at least partially a free end of said lever arms.

Preferably, the support plate comprises at least one guide hole which receives in a sliding coupling at least one axial guide, the axial guide being positioned at a radial end of the caliper body, on the opposite side of the connection bridges to the pistons.

Preferably, the support plate comprises at least one guide hole which receives in coupling said axial guides, the axial guides being positioned at a radial end, substantially aligned, in a radial direction, with said pistons.

DESCRIPTION OF THE FIGURES

The technical features of the invention are clearly found in the contents of the claims below and the advantages of the same will appear more clearly from the following detailed description, made with reference to the annexed drawings, which show one or more purely exemplifying and non-limiting embodiments thereof, in which:

DETAILED DESCRIPTION

With reference to the drawings, reference numeral 4 indicates as a whole a caliper for disc brake having a caliper body 8 provided with a pair of half-bodies 9, 10 connected to each other by means of at least one connection bridge 12.

The caliper body 8 may be of the monobloc type, in which the half-bodies 9, 10 are integral to each other, or the half-bodies 9, 10 may be mechanically joined together for example by means of threaded connection means.

The caliper body 8 may be fixed or floating.

The caliper body 8 defines at least partially a housing compartment 16 for an associable disc brake (not shown) and houses at least one pair of pads 20, 22 positioned on sides opposite said housing compartment 16 in an axial direction X-X.

The housing compartment 16 has a disc-sector shape and is radially delimited by one or more connection bridges 12.

By radial direction R-R it is meant a direction perpendicular to the axial direction X-X and directed towards the axis of rotation of the associable brake disc.

The connection bridges 12, according to the type of caliper, may be lateral and/or central, in a known manner.

The lateral connection bridges 12 are arranged at tangential or lateral ends 24 of the caliper body 8; the central connection bridge 12 is arranged at the thrust pistons of pads 20, 22.

By tangential direction it is meant a direction perpendicular to the axial X-X and radial R-R direction.

Pads 20, 22 comprise a support plate 28 and a friction portion 30 suitable for exerting a friction on the associable brake disc. The support plate 28 and the friction portion 30 may be made in separate parts, preferably of different materials, subsequently assembled together, or pads 20, 22 may also be integrally made.

The present invention applies to any type of pads and/or caliper body: therefore, it also applies to calipers 4 having two or more pads for each half-body 9, 10.

The caliper body 8 comprises at least one thrust piston 32 operable in parallel to the axial direction X-X and at least one axial guide 36 suitable for supporting and guiding pad 20, 22 in the axial direction X-X.

Piston 32 preferably is hydraulically driven, but the drive may also be pneumatic or electric. Piston 32 preferably has a cylindrical geometry.

Piston 32 interfaces with the support plate 28 of pad 20, 22 so as to press the friction portion 30 against the associable brake disc.

The support plate 28 comprises at least one guide hole 40 which receives in sliding coupling at least one axial guide 36 for pad 20, 22.

According to one embodiment, the guide hole 40 is positioned at a radial end of the caliper body 8, on the opposite side of the connection bridges 12 to pistons 32.

The guide hole 40 receives the axial guide 36 with clearance so as to allow the axial sliding of the pads relative to the guide itself. To this end, the guide hole 40 is preferably counter-shaped relative to the axial guide 36.

According to an embodiment, the axial guide 36 is a cylindrical pin arranged parallel to the axial direction X-X.

Said cylindrical pin may be continuous between the half-bodies 9, 10, so as to extend astride the housing compartment 16, or cylindrical pins may be provided, arranged cantilevered with respect to each half-body 9, 10, projecting towards the housing compartment 16.

Preferably, the axial guide 36 is positioned at a radial end, substantially aligned, in a radial direction, with said pistons 32.

By alignment in the radial direction RR, it is meant that symmetry axes passing by the axial guides 36 and pistons 32 are substantially aligned on the same circumference. In fact, the alignment in the radial direction RR between the axial guide 36 and pistons 32 favours the axial sliding of pad 20, 22 under the thrust of the pistons and improves the thrust of the pad on the brake disc; in other words, possible jamming of the stroke 20, 22 of pad 20, 22 in the braking step is prevented Advantageously, the caliper body 8 comprises a first thrust spring 48 which exerts a thrust F on pad 20, 22, said thrust having a first axial component Fa, directed parallel to the axial direction X-X towards pistons 32, and a first radial component Fr directed along a radial direction R-R perpendicular to said axial direction and substantially incident to the rotation axis of the associable disc brake.

Figure 1:
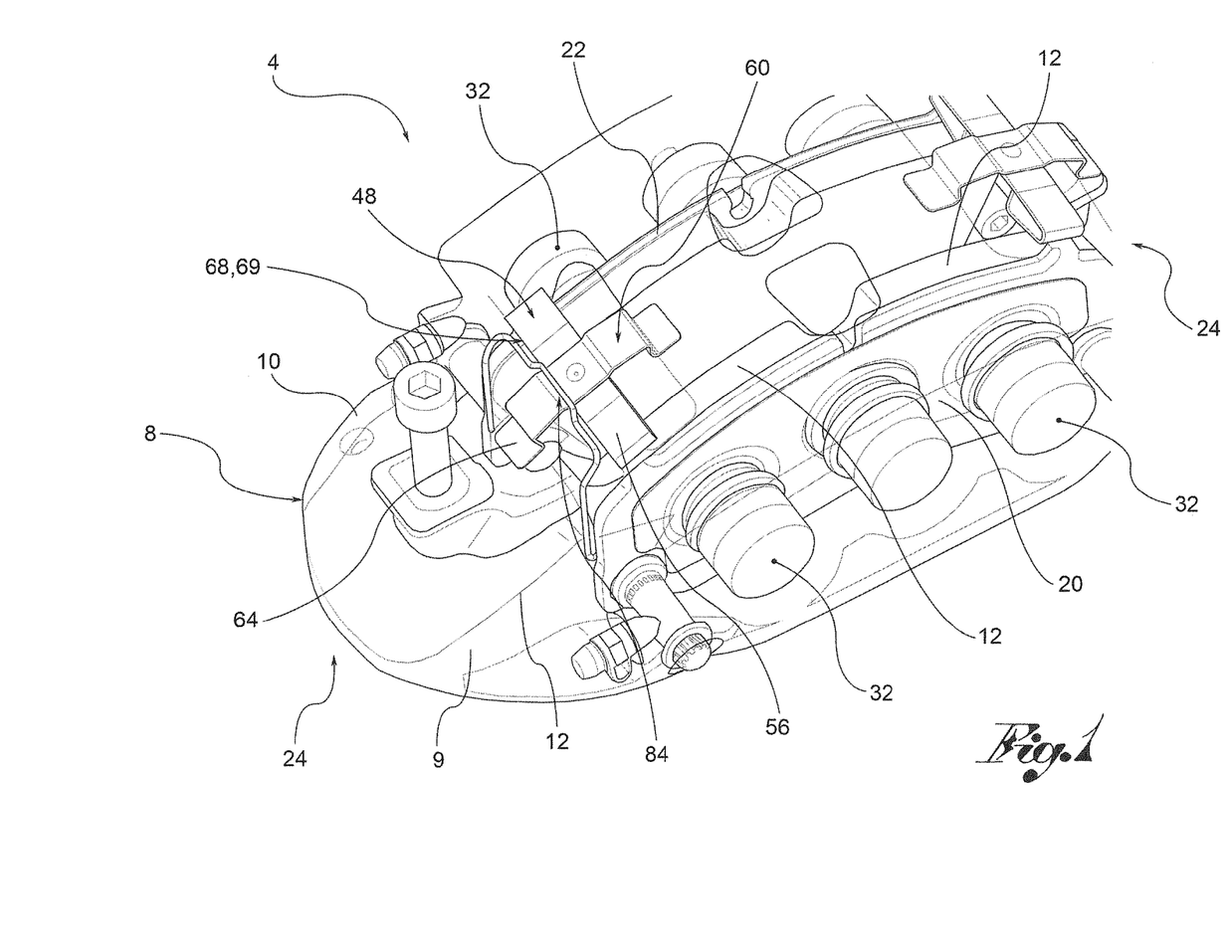
FIG. 1 shows a perspective view of a caliper for disc brake according to an embodiment of the present invention.
Figure 2:
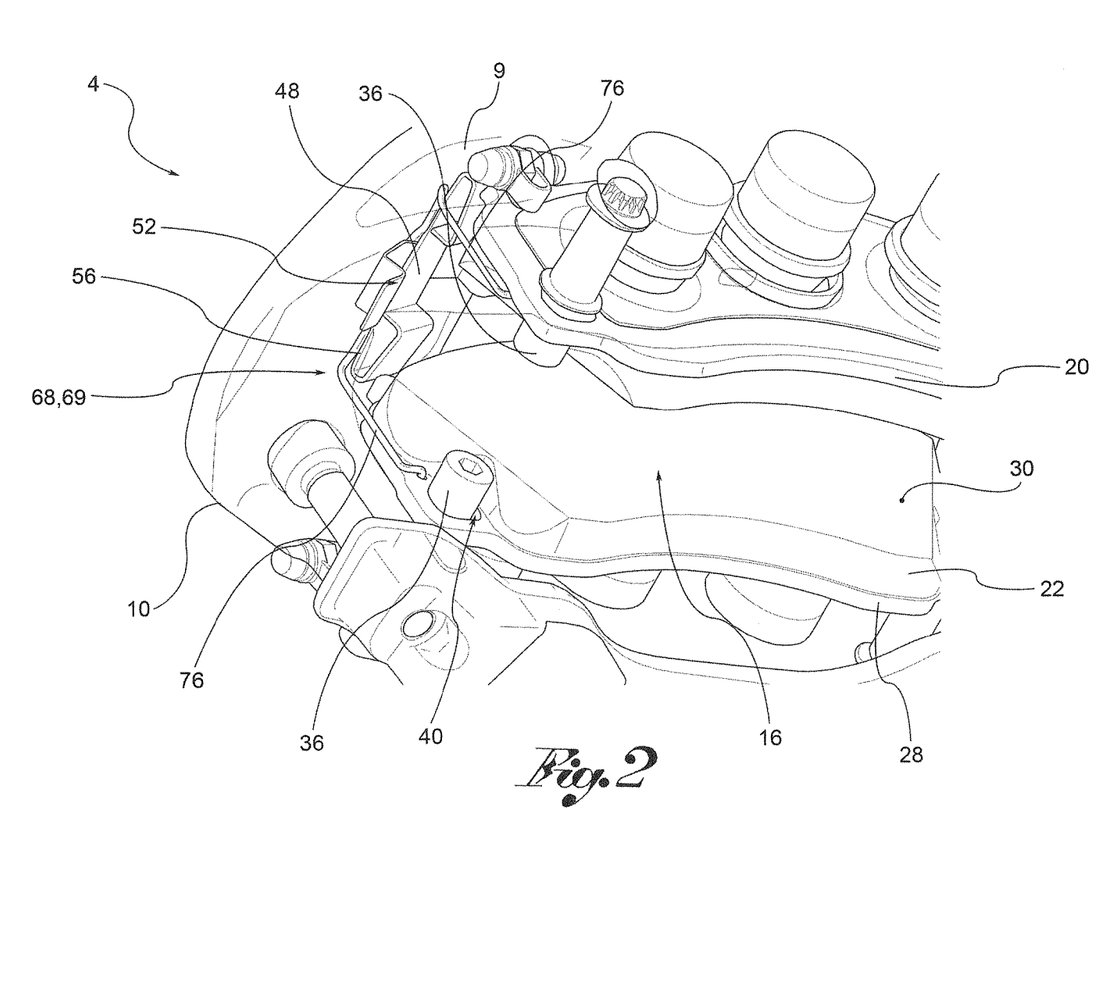
FIG. 2 shows a perspective view of the caliper for disc brake, from a different angle.
Figure 3:
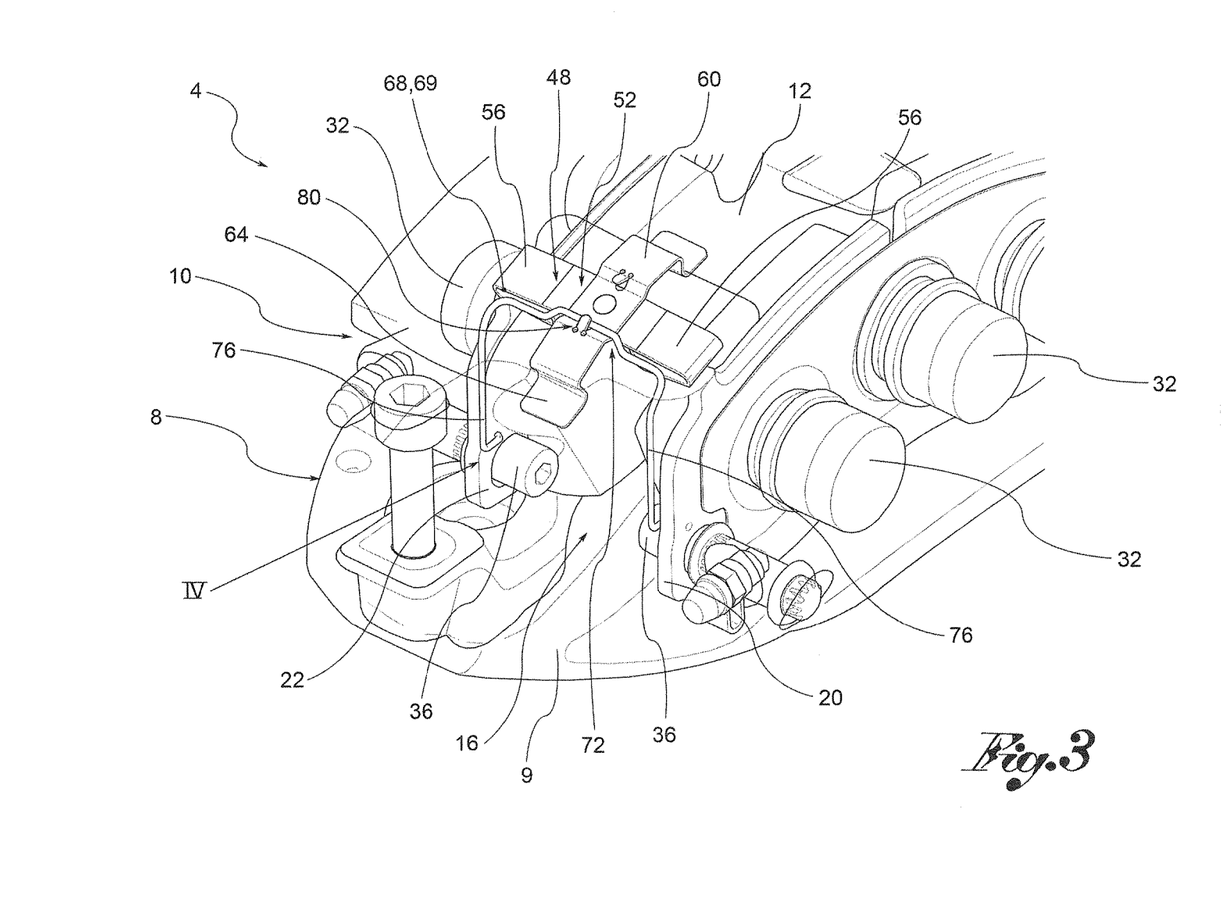
FIG. 3 shows a perspective view of a caliper for disc brake according to a further embodiment of the present invention.
Figure 4:
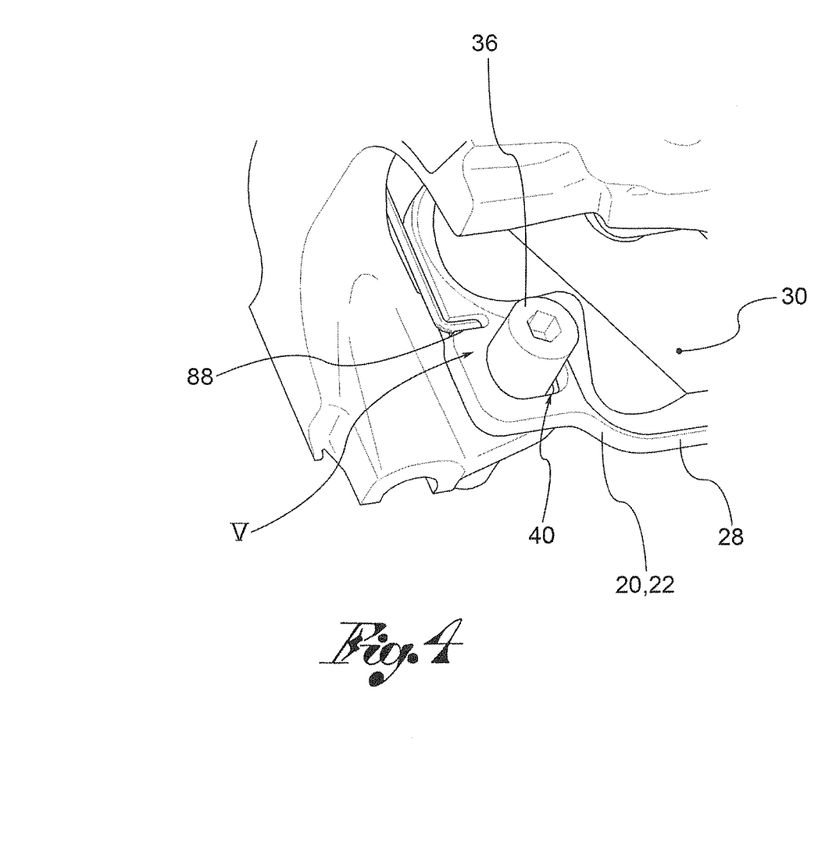
FIG. 4 shows a perspective view of the enlarged detail IV in FIG. 3.
Figure 5:
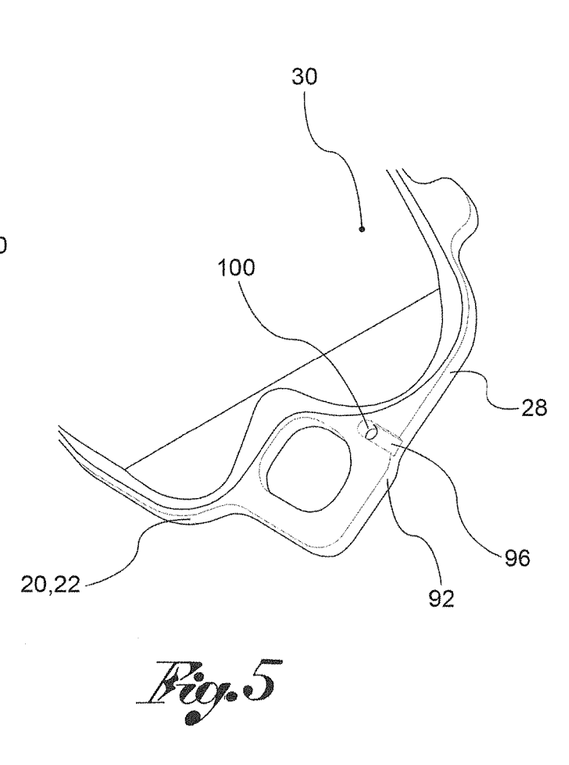
FIG. 5 shows an enlarged perspective view of detail V in FIG. 4.
Figure 6:
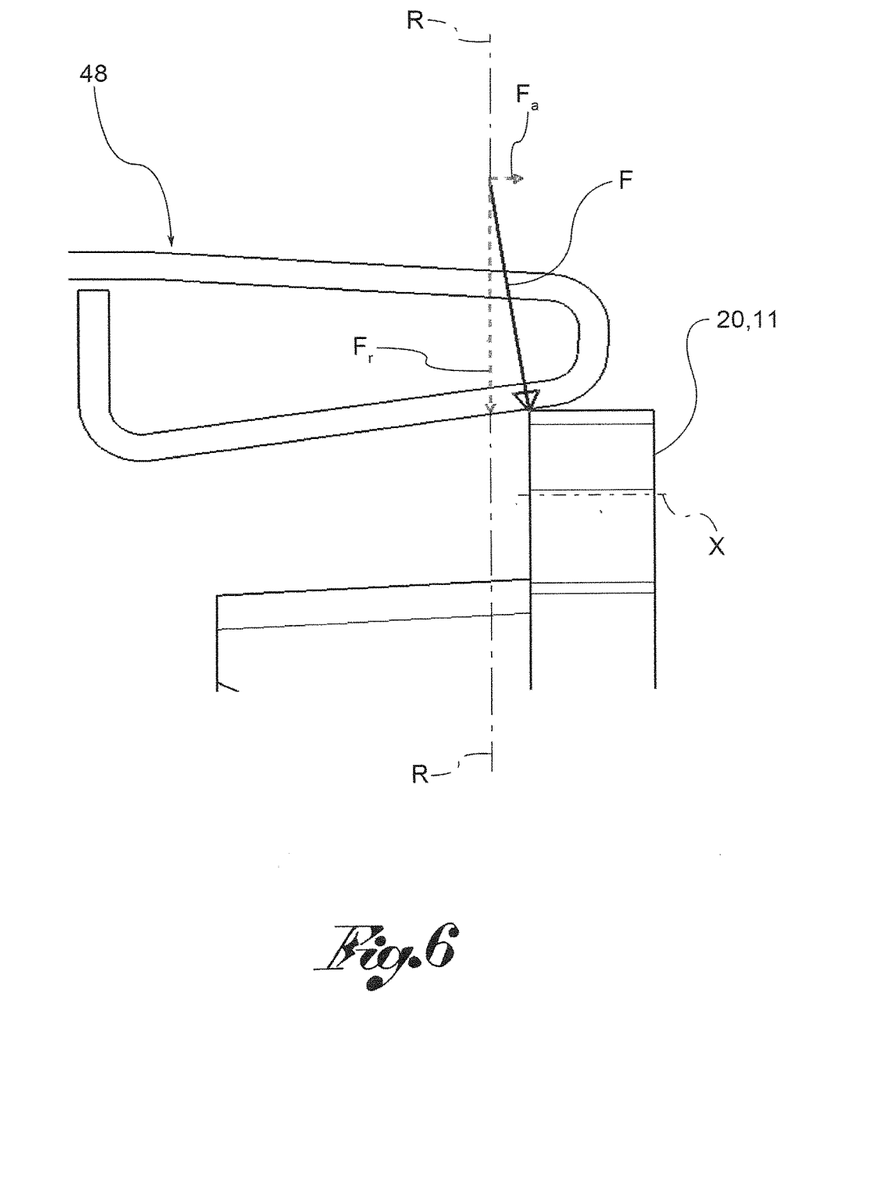
FIGS. 6-8 show schematic views of the forces exchanged within a caliper for disc brake according to the present invention, as better described hereinafter.

The forces exerted by the first thrust spring 48 are for example schematically shown in FIG. 6.

The first axial component Fa has the purpose of moving pad 20, 22 away from the brake disc when the braking action ends; therefore, it is directed towards 32 so as to facilitate the detachment of pad 20, 22 from the brake disc. The first radial component Fr has the function of ensuring the contact between the guide hole 40 and the axial guide 36. The first radial component Fr may then be directed both radially outwards, i.e. towards the connection bridges 12, and inwards, i.e. towards the rotation axis of the associable brake disc, according to the type of caliper and/or pad used.

For example, the first thrust spring 48 is a leaf spring having a central portion 52, disposed astride the housing compartment 16, with which it is anchored to the caliper body 8, and a pair of bent flaps 56 so as to exert a thrust on pad 20, 22 having both the axial component Fa and the radial component Fr.

According to one embodiment, the central portion 52 is attached to the caliper body 8 through the interposition of an attachment bracket 60. The attachment bracket 60 preferably includes strips 64 with which it is fixed to the connection bridges 12 of the caliper body, such as on the side radially facing the housing compartment 16.

As described above, the axial component Fa exerts a thrust which facilitates the detachment or removal of pad 20, 22 from the brake disc at the end of the braking action, i.e. during the release of the brake. The radial component Fr pushes the support plate 28 of the pad to slide in contact on the axial guide 36. In other words, the radial component Fr ensures the sliding contact between the inner surface of the guide hole 40 and the axial guide itself.

In particular, thanks to this radial component Fr, a frictional force Ff is exerted between the axial guide 36 and the guide hole 40 of the support plate 28 which force is equal to the product of the radial component Fr by the friction coefficient μ between the axial guide 36 and the support plate 28; i.e. Ff=μ*Fr.

Figure 7:
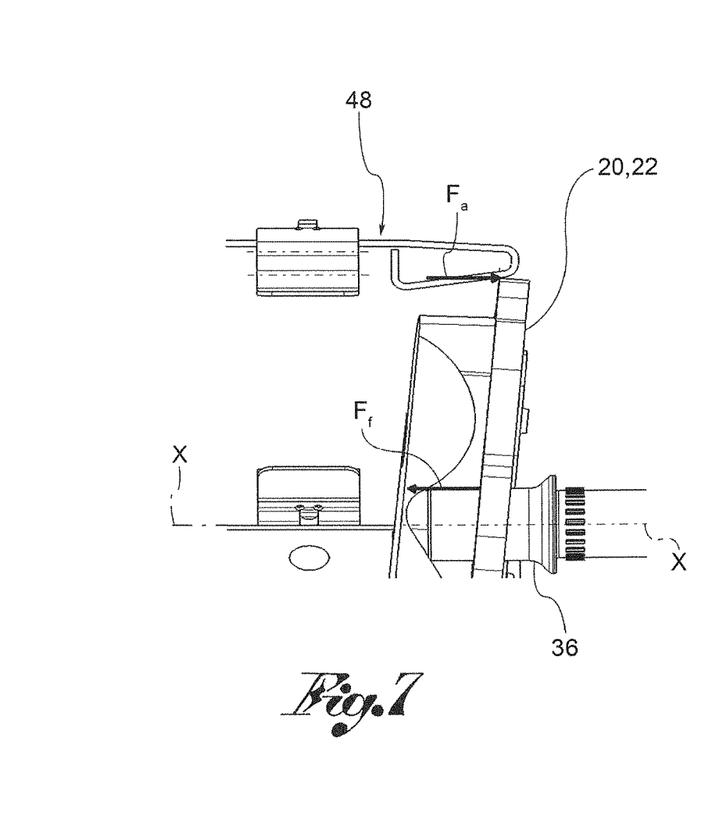

Such a friction force Ff opposes the retraction of pad 20, 22 and generates, together with the first axial component Fa of the first thrust spring 48, a rotating torque which tends to rotate the pad itself, as schematically shown in FIG. 7.

In other words, pad 20, 22, under the effect of the first thrust spring 48 and the frictional force Ff, tends to have a rotation and translation motion relative to its axial guides 36.

Advantageously, caliper 4 according to the present invention comprises at least one compensation spring 68 mechanically separate from the first thrust spring 48. Said compensating spring 68 exerts a thrust action on pad 20, 22, the thrust having a second axial component Fs directed axially and in a direction of approach of pad 20, 22 to pistons 32 so as to facilitate the detachment of pad 20, 22 from the brake disc in the absence of braking action.

In other words, the direction of the second axial component Fs is concordant with the direction of the first axial component Fa.

Figure 8:
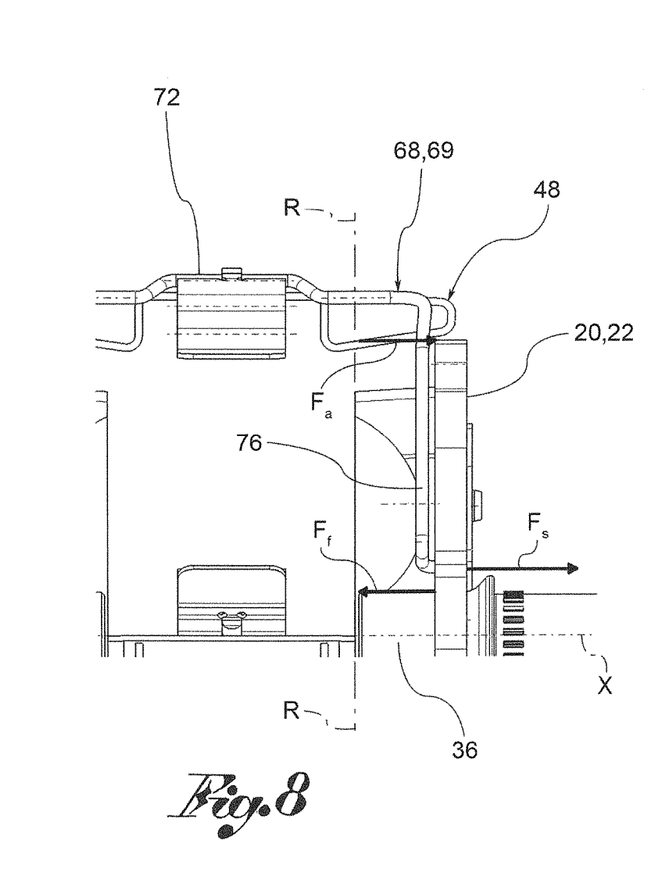
Figure 9:
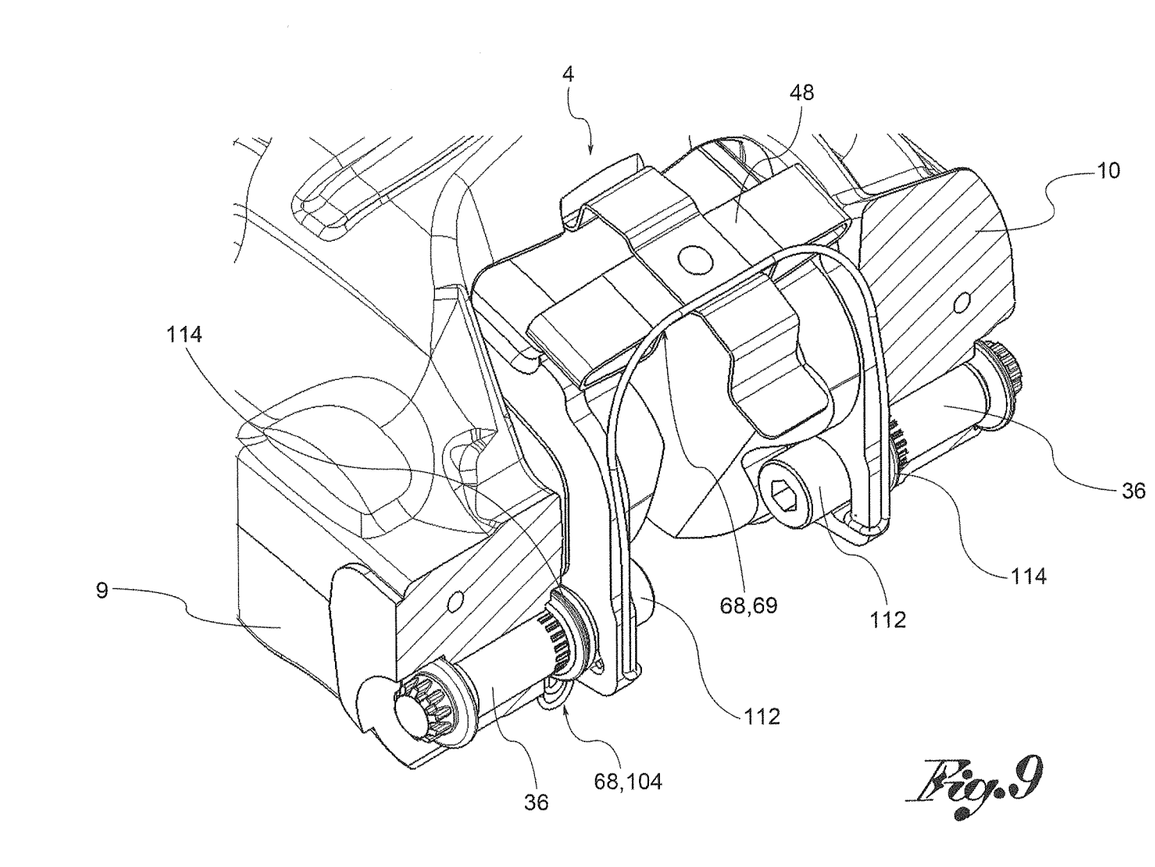
FIGS. 9-11 show partial cutaway views of embodiments of the present invention.
Figure 10:
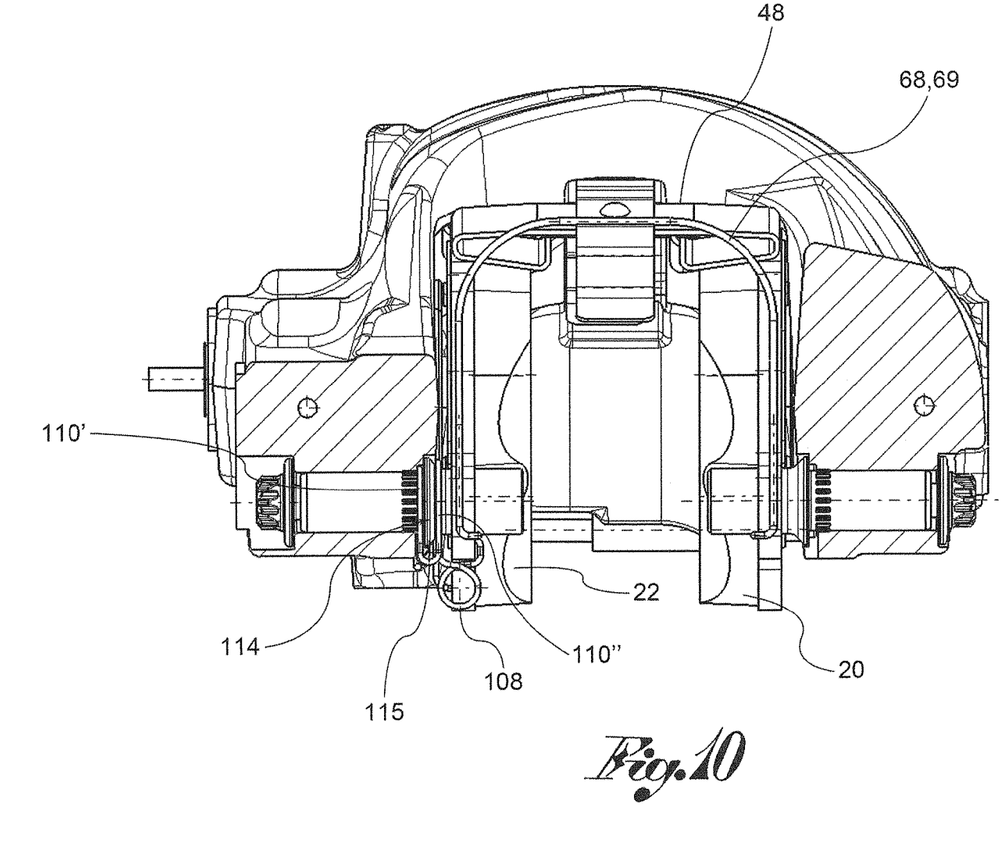
Figure 11:
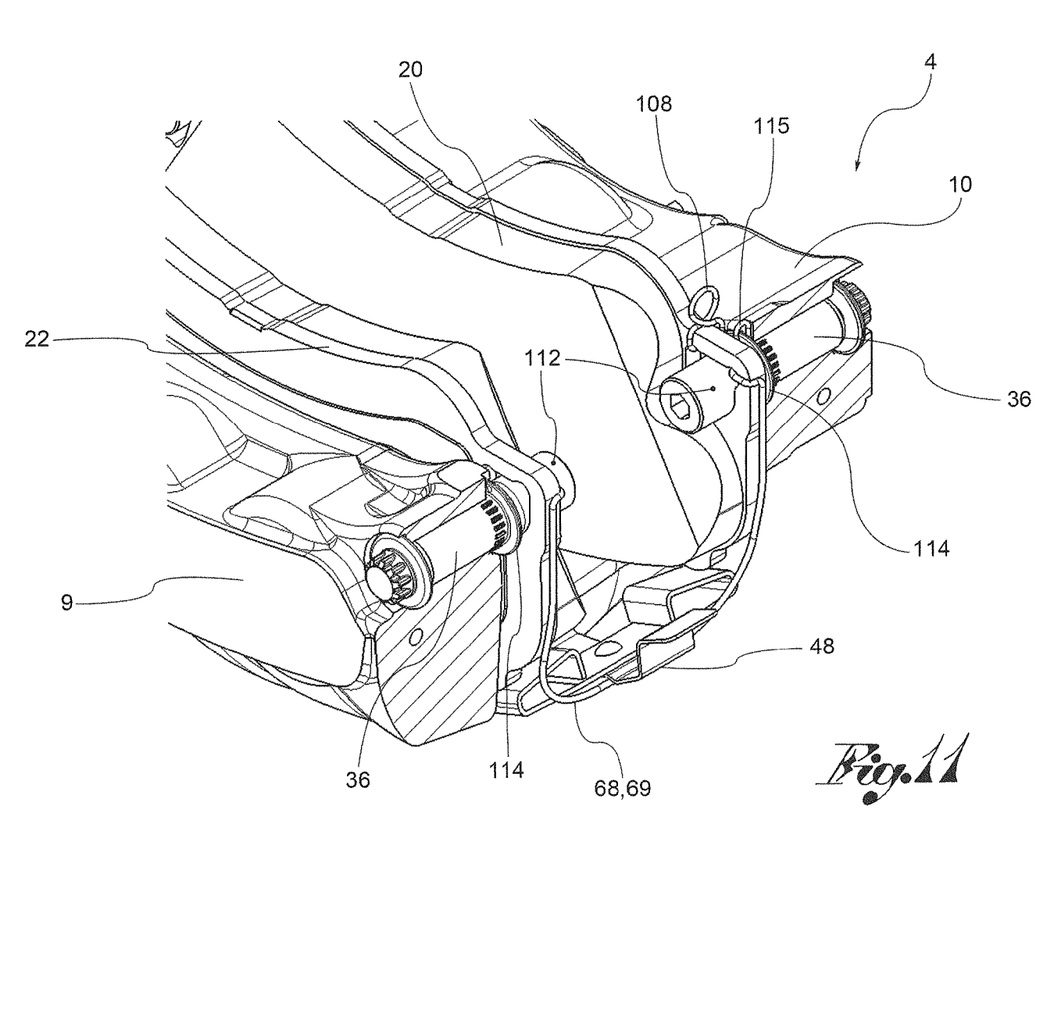
Figures 12, 13:
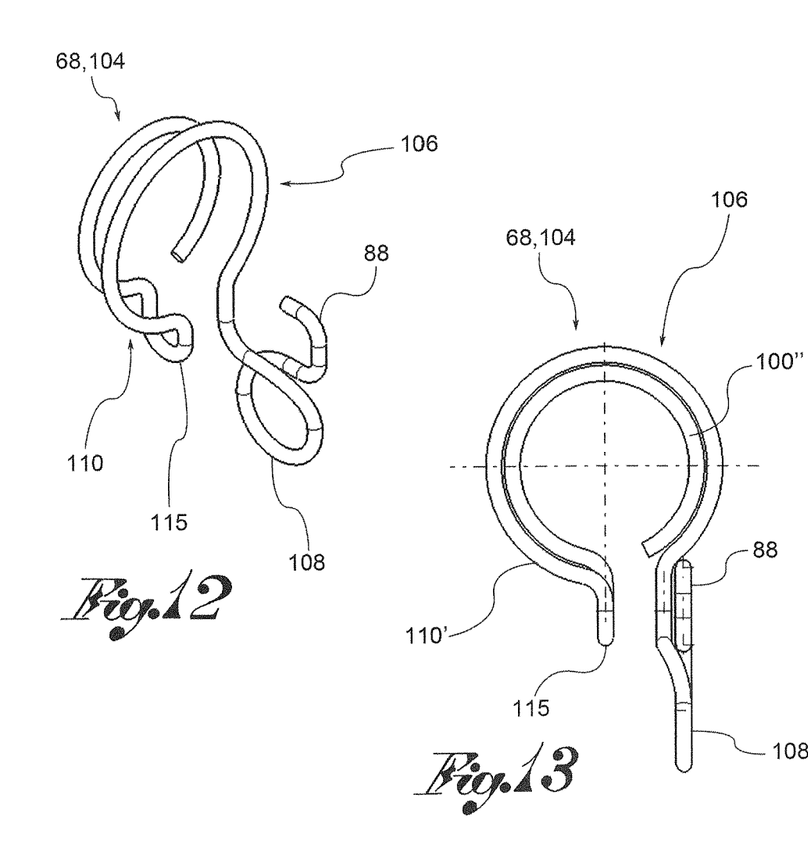
FIGS. 12-14 show views from different angles of a detail of the present invention.
Figure 14:
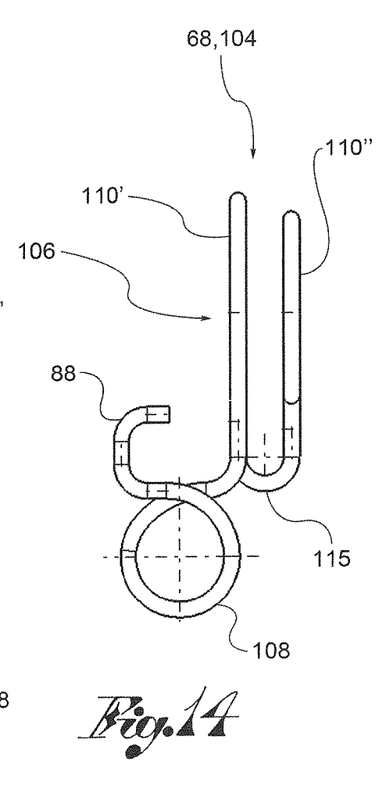
Figure 15:
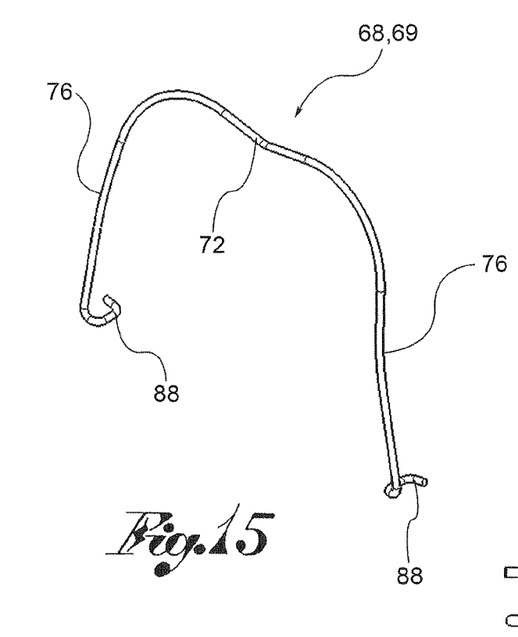
FIGS. 15-16 show views from different angles of a further detail of the present invention.
Figure 16:
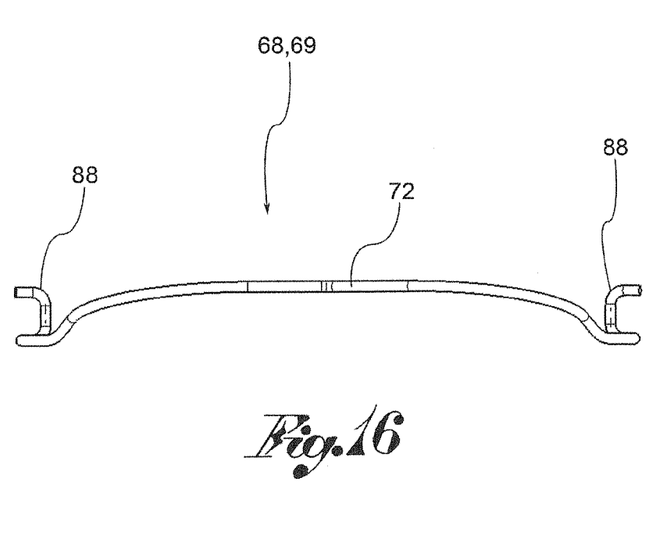

Advantageously, the compensation spring 68 is sized so that the second axial component Fs annuls the moment of the friction force Ff exchanged between pad 20, 22 and the axial guide 36 with respect to the point of application of the first axial component Fa on the pad itself. In this way, the pad is guided in its motion of retraction or detachment from the associable brake disc to have a pure axial motion of translation, without rotating with respect to the axial guide, as schematically shown in FIG. 8.

For example, if the second axial component Fs is applied at the friction force Ff, so that both the second axial component Fs and the friction force Ff have the same arm with respect to the point of application of the first axial component Fa on pad 20, 22, then it is sufficient to size the compensation spring 68 so that the second axial component Fs has the same intensity but opposite direction with respect to the frictional force Ff.

In other words, if the second axial component Fs is applied to the pad at the axial guide 36, the compensating spring 68 is calibrated in such a way as to exert a second axial component Fs on pad 20, 22, equal in intensity and opposite in direction, with respect to the axial thrust Fa exchanged, in the axial direction, between pad 20, 22 and the axial guide 36.

According to an embodiment, the compensation spring comprises a "U" shaped spring 69 having a central section 72, at which the caliper body 8 is coupled, and a pair of lever arms 76 which interface with pads 20, 22; the central section 72 being positioned astride the housing compartment 16 of the associable disc brake and the lever arms 76 acting on pads 20, 22 axially opposite one another. Overall, the 'U'-shaped spring 69 arranges astride of the associable brake disc as well as the housing compartment 16.

Preferably, the central section 72 forms the attachment of the "U" shaped spring 69 to the caliper body 8 so as to keep the lever arms 76 overhanging the central section 72.

According to one embodiment, the 'U'-shaped spring 69 is constrained to the attachment bracket 60 associated to the caliper body 8 at a connection bridge 12. Preferably, said attachment bracket 60 also constrains the first thrust spring 48 to the caliper body 8.

According to an embodiment, the 'U'-shaped spring 69 is joined to the attachment bracket 60 by means of a snap coupling between the central section 72 and a pawl 80 made on the attachment bracket 60, for example by shearing.

According to a further embodiment, the 'U'-shaped spring 69 is joined to the attachment bracket 60 by means of a snap coupling between the central section 72 and a notch 84 made on the attachment bracket 60.

According to an embodiment, the lever arms 76 of the 'U'-shaped spring 69 end with a bent portion 88 so as to couple to a lateral rim 92 of the support plate 28 of pad 20, 22.

The support plate 28 of pad 20, 22 comprises a groove 96 suitable for at least partially housing the bent portions 88 of the lever arms 76.

According to one embodiment, the support plate 28 comprises at least one coupling hole 100 which houses at least partially a free end of said lever arms 76.

The coupling hole 100 ensures that the 'U'-shaped spring 69 does not release from pad 20, 22.

According to an embodiment of the present invention, the compensation spring 68 comprises a, coil spring 104.

The coil spring' 104 comprises an attachment portion 106 and a thrust eye 108; the attachment portion 106 allows the attachment of the coil spring 104 to the caliper body 8, while the thrust eye 108 exerts on pad 20, 22 the force of the second axial component Fs so as to facilitate the detachment of pad 20, 22 from the brake disc, annulling the friction force Ff.

In particular, the attachment portion 106 comprises at least one ring 110 which tightens elastically around said axial guide 36 for pads 20, 22. For example, the axial guide 36 comprises a cylindrical section 112 which, on the side opposite the associable pad 20, 22, comprises a widening 114, for example conical. Preferably, the attachment portion 106 comprises two rings 110', 110" positioned astride said widening 114 so as to permit a solid anchorage of the coil spring 104 to the axial guide 36. Preferably, said rings 110', 110" are concentric to each other; preferably, said rings 110', 110" are connected to each other by means of an arched portion 115 substantially perpendicular thereto. According to an embodiment, the thrust eye 108 ends with a bent portion suitable for coupling to the lateral rim 92 of the support plate 28 of pad 20, 22.

The coil spring 104 is formed so that the thrust eye 108 tends to push rings 110', 110", relative to the axial direction X-X, towards the bent portion 88.

Preferably, the thrust eye 108 develops perpendicularly to said rings 110', 110" so that rings 110', 110" may exert a reaction to the second axial component Fs.

Preferably, a coil spring 104 is provided on each axial guide 36 of the caliper body 8.

Preferably, the coil spring 104 is suitably made by integrally bending a single wire of metal material.

According to the present invention, the compensation spring 68 may include a 'U'-shaped spring 69 and/or at least one coil spring 104. Therefore, in other words, to compensate the thrust exerted by the first thrust spring 48, a 'U'-shaped spring 69 may be individually added, acting simultaneously on the opposite pads 20, 22, or at the axial guide 36 of each pad 20, 22, a relative coil spring 104; moreover, the 'U'-shaped spring 69 and the coil springs 104 may coexist and cooperate in the compensation of the friction force Ff. In this case, on each pad 20, 22, in addition to the thrust exerted by the first thrust spring 48, the thrusts exerted by the 'U'-shaped 69 and by the coil springs 104 having the same direction and opposite to the direction of the friction force Ff will act at the same time.

As may be appreciated from the above description, the caliper for disc brake according to the present invention allows overcoming the limits of the calipers of the prior art.

In fact, thanks to the combined use of the first and second thrust spring, in the brake release step, the pad is always moved away from the brake disc, avoiding any type of residual braking torque. The removal of the pad from the brake disc is always ensured by the fact that the pad is guided by the thrust springs and by the compensation springs in the axial direction, thus avoiding possible jamming of the pad on the axial guides. In other words, the pad moves axially without rotating, since the compensation spring annuls the effect of rotation due to the friction force between the pad and the axial guide.

Of course, in the practical embodiment thereof, the caliper for brake disc may take shapes and configurations differing from that shown above without departing from the present scope of protection.

Moreover, all the parts may be replaced by technically equivalent ones and the sizes, shapes and materials used may be whatever according to the requirements.

The invention claimed is:

1. A caliper for disc brake comprising:
a caliper body having a pair of half-bodies connected to each other via at least one connection bridge, wherein the caliper body defines at least partially a housing compartment for an associable disc brake, and houses at least one pair of pads of a plurality of pads positioned on sides opposite said housing compartment in an axial direction, each pad of the plurality of pads comprising a support plate and a friction portion configured to exert friction on the associable disc brake when braking, the caliper body comprises:
at least one thrust piston operable parallel to the axial direction and at least one axial guide configured to support and guide each pad in an axial direction, wherein the at least one thrust piston is configured to exert a piston force during braking and interfaces with the support plate of each pad so as to press the friction portion against the associable disc brake;
a first thrust spring configured to exert a first thrust force on each pad at a point of application away from an axial guide, said first thrust force having a first axial component, directed parallel to the axial direction towards each piston, and a first radial component perpendicular to said axial direction and directed toward a rotation axis of the associable disc brake; and
at least one compensation spring, mechanically separate from the first thrust spring, wherein the compensation spring is configured to exert a second thrust force on each pad, said second thrust force having a second axial component, directed axially and towards each piston so as to facilitate release of each pad from contact with the associable disc brake in absence of braking, the compensation spring being sized and positioned so that the second axial component of the second thrust force cancels moment caused by a friction force exchanged between each pad and the axial guide in relation to the point of application of the first axial component on each pad;
wherein the at least one compensation spring is a 'U'-shaped spring is constrained to an attachment bracket joined to the caliper body at a connection bridge between the half-bodies; and
wherein said attachment bracket also constrains the first thrust spring to the caliper body.

2. The caliper for disc brake according to claim 1, wherein the compensation spring is calibrated such that the second axial component of the second thrust force exerted on each pad is equal to the friction force between each pad and the axial guide in absence of braking and opposing the axial direction of the friction force, wherein the friction force is proportional to the first radial component of the first thrust spring by a coefficient of friction and said second axial component is applied to each pad at said axial guide.

3. The caliper for disc brake according to claim 1, wherein a 'U'-shaped spring is constrained to an attachment bracket joined to the caliper body at a connection bridge between the half-bodies.

4. The caliper for disc brake according to claim 1, wherein the support plate comprises at least one guide hole which receives in a sliding coupling at least one axial guide, the axial guide being positioned at a radial end of the caliper body, on the opposite side of the at least one connection bridge to the pistons.

5. The caliper for disc brake according to claim 1, wherein the support plate comprises at least one guide hole which receives in coupling said axial guides, the axial guides being positioned at a radial end, substantially aligned, in a radial direction, with said pistons.

6. The caliper for disc brake according to claim 1, wherein the compensation spring comprises a coil spring having an attachment portion and a thrust eye, the attachment portion permitting attachment of the coil spring to the caliper body, while the thrust eye ends with a bent portion so as to couple to a lateral rim of the support plate of each pad, so as to exert on each pad the force of the second axial component and facilitate the release of each pad from the brake disc in absence of braking, opposing the friction force exchanged between each pad and the axial guide.

7. The caliper for disc brake according to claim 6, wherein the attachment portion comprises at least one ring which tightens elastically around said axial guide for the at least one pair of pads.

8. The caliper for disc brake according to claim 7, wherein the thrust eye extends perpendicular to the at least one ring so that the at least one ring can exert a reaction to the second axial component.

9. The caliper for disc brake according to claim 1, wherein the compensation spring comprises the 'U'-shaped spring having a central section, at which the caliper body is coupled, and a pair of lever arms which interface with the at least one pair of pads, the central section being positioned astride the housing compartment of the associable disc brake and the pair of lever arms acting on the at least one pair of pads positioned axially opposite one another.

10. The caliper for disc brake according to claim 9, wherein the central section forms an attachment of the 'U'-shaped spring to the caliper body so as to keep the pair of lever arms overhanging the central section.

11. The caliper for disc brake according to claim 9, wherein the 'U'-shaped spring is joined to an attachment bracket by means of a snap coupling between the central section and a pawl made on the attachment bracket.

12. The caliper for disc brake according to claim 9, wherein the 'U'-shaped spring is joined to an attachment bracket by means of a snap coupling between the central section and a notch made on the attachment bracket.

13. The caliper for disc brake according to claim 9, wherein the pair of lever arms of the 'U'-shaped spring end with a bent portion so as to couple to a lateral rim of the support plate of each pad.

14. The caliper for disc brake according to claim 9, wherein the support plate of each pad comprises a groove suitable for housing at least partially bent portions of the pair of lever arms.

15. The caliper for disc brake according to claim 9, wherein the support plate comprises at least one coupling hole which houses at least partially a free end of said pair of lever arms.

16. A caliper for disc brake comprising:
- a caliper body having a pair of half-bodies connected to each other via at least one connection bridge, wherein the caliper body defines at least partially a housing compartment for an associable disc brake, and houses at least one pair of pads of a plurality of pads positioned on sides opposite said housing compartment in an axial direction, each pad of the plurality of pads comprising a support plate and a friction portion configured to exert friction on the associable disc brake when braking, the caliper body comprises:
  - at least one thrust piston operable parallel to the axial direction and at least one axial guide configured to support and guide each pad in an axial direction, wherein the at least one thrust piston is configured to exert a piston force during braking and interfaces with the support plate of each pad so as to press the friction portion against the associable disc brake;
- a first thrust spring configured to exert a first thrust force on each pad at a point of application away from an axial guide, said first thrust force having a first axial component, directed parallel to the axial direction towards the pistons, and a first radial component perpendicular to said axial direction and directed toward a rotation axis of the associable disc brake; and
- at least one compensation spring, mechanically separate from the first thrust spring, wherein the compensation spring is configured to exert a second thrust force on each pad, said second thrust force having a second axial component, directed axially and towards each piston so as to facilitate release of each pad from contact with the associable disc brake in absence of braking, the compensation spring being sized and positioned so that the second axial component of the second thrust force cancels moment caused by a friction force exchanged between each pad and the axial guide in relation to the point of application of the first axial component on each pad;
- wherein the compensation spring comprises a coil spring having an attachment portion and a thrust eye, the attachment portion permitting attachment of the coil spring to the caliper body, while the thrust eye ends with a bent portion so as to couple to a lateral rim of the support plate of each pad, so as to exert on each pad the force of the second axial component and facilitate the release of each pad from the brake disc in absence of braking, opposing the friction force exchanged between each pad and the axial guide; and
- wherein the axial guide comprises a cylindrical section which, on the side opposite each associable pad, comprises a widening, and wherein the attachment portion comprises two rings positioned astride said widening so as to permit an anchorage of the coil spring to the axial guide.

17. The caliper for disc brake according to claim 16, wherein said rings are concentric to each other and are connected to each other by means of an arched portion substantially perpendicular thereto.

* * * * *